United States Patent
Carls et al.

(10) Patent No.: US 10,578,884 B2
(45) Date of Patent: *Mar. 3, 2020

(54) METHOD OF MAKING A POLARIZING BEAMSPLITTER ARRAY

(71) Applicant: 3M INNOVATIVE PROPERTIES COMPANY, St. Paul, MN (US)

(72) Inventors: Joseph C. Carls, Austin, TX (US); James M. Nelson, Lino Lakes, MN (US); Charles N. DeVore, Hugo, MN (US); Dwight G. Baldwin, Austin, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/812,023

(22) Filed: Nov. 14, 2017

(65) Prior Publication Data

US 2018/0081191 A1   Mar. 22, 2018

Related U.S. Application Data

(63) Continuation of application No. 14/399,989, filed as application No. PCT/US2013/046683 on Jun. 20, 2013, now Pat. No. 9,841,605.

(Continued)

(51) Int. Cl.
*G02B 5/30* (2006.01)
*G02B 27/28* (2006.01)
(Continued)

(52) U.S. Cl.
CPC .......... *G02B 27/285* (2013.01); *B26D 3/065* (2013.01); *B29D 11/00644* (2013.01);
(Continued)

(58) Field of Classification Search
CPC .......... G02F 1/0136; G02F 2001/0144; G02F 1/133528; G02F 1/133536; G02F 2001/133545–13355; G02F 1/13362; G02F 1/13363; G02F 2001/133638; G02F 2001/133548; G02F 2001/13355; G02B 1/08; G02B 5/04–045; G02B 5/30–3066; G02B 5/3083; G02B 5/32;
(Continued)

(56) References Cited

U.S. PATENT DOCUMENTS 3,739,455 A   6/1973   Alvarez
3,827,798 A   8/1974   Alvarez
(Continued)

FOREIGN PATENT DOCUMENTS

DE   102011087846   6/2013
JP   S62-34104   2/1987
(Continued)

OTHER PUBLICATIONS

PCT International Search Report from PCT/US2013/046683 dated Sep. 27, 2013, 3 pages.

*Primary Examiner* — Arnel C Lavarias
(74) *Attorney, Agent, or Firm* — Jonathan L. Tolstedt (57) ABSTRACT

An optical component array and method of making an optical component array includes a plurality of optical components useful for projection devices or other optical devices.

4 Claims, 7 Drawing Sheets

US 10,578,884 B2

Page 2

Related U.S. Application Data (60) Provisional application No. 61/664,948, filed on Jun. 27, 2012.

(51) Int. Cl.
  *G02B 27/14* (2006.01)
  *G02B 27/10* (2006.01)
  *B29D 11/00* (2006.01)
  *B26D 3/06* (2006.01)
  *G03B 21/20* (2006.01)
  *B32B 38/00* (2006.01)

(52) U.S. Cl.
  CPC ............ *B32B 38/0004* (2013.01); *G02B 5/30* (2013.01); *G02B 5/305* (2013.01); *G02B 5/3083* (2013.01); *G02B 27/1006* (2013.01); *G02B 27/1073* (2013.01); *G02B 27/141* (2013.01); *G03B 21/2013* (2013.01); *G03B 21/2033* (2013.01); *G03B 21/2073* (2013.01); *Y10T 156/1064* (2015.01); *Y10T 156/1082* (2015.01); *Y10T 428/24612* (2015.01)

(58) Field of Classification Search
  CPC ...... G02B 27/10–1053; G02B 27/1073; G02B 27/14–143; G02B 27/145; G02B 27/28; G02B 27/283–288; G02B 5/3008; G02B 5/3016; G02B 5/3025; G02B 5/3033; G02B 5/3041; G02B 5/305; G02B 5/3058; G02B 5/3066; G02B 27/1006; G02B 27/1013; G02B 27/102; G02B 27/1026; G02B 27/1033; G02B 27/104; G02B 27/1046; G02B 27/1053; G02B 27/141; G02B 27/142; G02B 27/143; G02B 27/285; G02B 27/286; G02B 27/288; G02B 5/045; G03B 21/2013; G03B 21/2033; G03B 21/2073; G03B 33/06; G03B 33/12; B29D 11/00644; B29D 11/00932; B32B 2307/42; B32B 38/0004; B32B 2551/00; B26D 3/06–065; F21V 9/14; H04N 9/3167; B29C 59/022; B29C 2059/023; B29C 2059/027; C03C 19/00
  USPC ............ 359/485.01–485.07, 487.01–487.06, 359/489.01, 489.06–489.13, 359/489.15–489.16, 489.19, 580, 583, 359/589–590, 629, 633, 634, 638, 359/639–640, 831, 833–834, 489.1; 156/99, 102, 106; 264/1.1, 1.21, 1.31, 264/1.34, 1.6, 1.7, 1.9, 2.7; 451/41; 349/9, 96; 353/20; 362/19
  See application file for complete search history.

(56) References Cited

U.S. PATENT DOCUMENTS

| | | | |
|---|---|---|---|
| 3,829,536 A | 8/1974 | Alvarez | |
| 5,124,841 A | 6/1992 | Oishi | |
| 5,400,179 A | 3/1995 | Ito | |
| 5,657,160 A * | 8/1997 | Miyatake | G02B 27/283 348/E5.141 |
| 5,751,480 A | 5/1998 | Kitagishi | |
| 6,028,708 A | 2/2000 | Gramann et al. | |
| 6,111,633 A * | 8/2000 | Albert | G02F 1/31 349/196 |
| 6,212,014 B1 | 4/2001 | Lehman, Jr. et al. | |
| 6,542,247 B2 | 4/2003 | Bockman | |
| 6,597,510 B2 | 7/2003 | Bunkenburg et al. | |
| 6,646,802 B2 * | 11/2003 | Yamamoto | G02B 5/3083 349/96 |
| 7,268,950 B2 | 9/2007 | Poulsen | |
| 7,365,909 B2 | 4/2008 | Yun et al. | |
| 7,619,824 B2 | 11/2009 | Poulsen | |
| 7,943,895 B2 * | 5/2011 | Nakasendo | G02B 5/26 156/154 |
| 9,513,485 B2 | 12/2016 | Freitag | |
| 2005/0059766 A1 | 3/2005 | Jones et al. | |
| 2007/0030566 A1 | 2/2007 | Chang | |
| 2007/0085973 A1 | 4/2007 | Duncan et al. | |
| 2007/0211339 A1 | 9/2007 | Furusato | |
| 2011/0074659 A1 | 3/2011 | Park et al. | |
| 2012/0058310 A1 * | 3/2012 | Ehnes | B22D 11/0674 428/169 |

FOREIGN PATENT DOCUMENTS

| | | |
|---|---|---|
| JP | H03-126910 | 5/1991 |
| JP | H05-107505 | 4/1993 |
| JP | H05-181014 | 7/1993 |
| JP | H05-203811 | 8/1993 |
| JP | H08-82710 | 3/1996 |
| JP | 2007-187851 | 7/2007 |
| WO | WO 2005/050264 | 6/2005 |
| WO | WO 2011-050233 | 4/2011 |

* cited by examiner

METHOD OF MAKING A POLARIZING BEAMSPLITTER ARRAY

BACKGROUND

The operation of Liquid Crystal on Silicon (LCOS) based projectors require the use of polarized light. Such projectors can require the use of polarizing beam splitters (PBS) and optionally, polarization converting systems (PCS) in order to operate efficiently. These specialized optical components are typically assembled by hand. Because of this, the labor content of these devices is relatively high and the yield is relatively low. These two factors generally can lead to a high cost for the component. In addition, the hand assembly can limit the PBS to illumination applications. The high cost of the components is ironic because the LCOS imagers are relatively inexpensive, and LCOS based systems are purported to be low-cost systems. This can lead to the situation where the high cost of the component offsets the low-cost of the imager.

SUMMARY

The present disclosure provides an optical component array and method of making an optical component array that can include a plurality of optical components useful for projection devices or other optical devices. The optical component array can be fabricated such that individual optical components having several elements can be assembled in a massively parallel manner and then singulated as individual optical components, and can result in a large reduction in manufacturing cost. In one aspect, the present disclosure provides a polarizing beamsplitter (PBS) array that includes a reflective polarizer; a plurality of first machined prisms each having a first diagonal surface adhered to a major surface of the reflective polarizer; and a plurality of second machined prisms each having a second diagonal surface adhered to an opposing major surface of the reflective polarizer. Each of the plurality of the first and the second machined prisms are aligned in registration with one another, forming a PBS array contiguous with the reflective polarizer.

In another aspect, the present disclosure provides an optical component array that includes a substrate film; a plurality of first machined prismatic structures each having a first diagonal surface adhered to a major surface of the substrate film; and a plurality of second machined prismatic structures each having a second diagonal surface adhered to an opposing major surface of the substrate film. Each of the plurality of the first and the second machined prismatic structures are aligned in registration with one another.

In yet another aspect, the present disclosure provides an optical component array that includes a substrate film; a plurality of first machined structures each having a first surface adhered to a major surface of the substrate film and a first land region connecting adjacent first machined structures; and a plurality of second machined structures each having a second surface adhered to an opposing major surface of the substrate film, and a second land region connecting adjacent second machined structures. Each of the plurality of the first and the second machined structures are aligned such that at least a portion of the first land region and the second land region are aligned in registration to each other and separated by the substrate film.

In yet another aspect, the present disclosure provides a method of making a PBS array that includes machining a first plurality of parallel vee-shaped ridges into a first sheet opposite a first planar surface, such that adjacent vee-shaped ridges are separated by a first land region; machining a second plurality of parallel vee-shaped ridges into a second sheet opposite a second planar surface, such that adjacent vee-shaped ridges are separated by a second land region; positioning a substrate film between the first planar surface and the second planar surface; aligning in registration the first plurality of parallel vee-shaped ridges with the second plurality of parallel vee-shaped ridges; and adhering the substrate film between the first planar surface and the second planar surface.

In yet another aspect, the present disclosure provides a method of making a PBS array that includes adhering a substrate film between a first sheet and a second sheet; machining a first plurality of parallel vee-shaped ridges into the first sheet, such that adjacent vee-shaped ridges are separated by a first land region; and machining a second plurality of parallel vee-shaped ridges into the second sheet, such that adjacent vee-shaped ridges are separated by a second land region and such that the first plurality of parallel vee-shaped ridges are aligned in registration with the second plurality of parallel vee-shaped ridges.

In yet another aspect, the present disclosure provides a method of making an optical component array that includes machining at least two first grooves into a first sheet opposite a first planar surface, such that a first land region separates each first groove from the first planar surface; machining at least two second grooves into a second sheet opposite a second planar surface, such that a second land region separates each second groove from the second planar surface; positioning a substrate film between the first planar surface and the second planar surface; aligning in registration the at least two first grooves with the at least two second grooves; and adhering the substrate film between the first planar surface and the second planar surface.

In yet another aspect, the present disclosure provides a method of making an optical component array that includes adhering a substrate film between a first sheet and a second sheet; machining at least two first grooves into the first sheet, such that each of the at least two first grooves are separated from the substrate film by a first land region; and machining at least two second grooves into the second sheet, such that each of the at least two second grooves are separated from the sheet by a second land region, and such that the first land region and second land region are aligned in registration opposite the substrate film.

In yet another aspect, the present disclosure provides an optical component array that includes a planar optical stack; and a plurality of first structures machined into the planar optical stack, each of the plurality of first structures having a first surface proximate to a major surface of the planar optical stack and a first land region connecting adjacent first structures.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides an optical component array and method of making an optical component array that can include a plurality of optical components useful for projection devices or other optical devices. The optical component array can be fabricated such that individual optical components having several elements can be assembled in a massively parallel fashion and then singulated (i.e., separated from each other) as individual optical components. This construction technique opens the possibility for a large reduction in manufacturing cost, and can eliminate much of the hand assembly which can be a significant source of variation in optical components. One obstacle encountered while manufacturing polarization control components is the need to ensure that the components exhibit a low enough level of birefringence. This can be difficult to accomplish in the case of mass-produced injection molded parts, since the residual stress associated with injection molding may frequently lead to high birefringence. However, at least for cost and lifetime reasons, plastic parts are very desirable.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

Also, for the purposes of the description provided herein, the term "aligned to a desired polarization state" is intended to associate the alignment of the pass axis of an optical element to a desired polarization state of light that passes through the optical element, i.e., a desired polarization state such as s-polarization, p-polarization, right-circular polarization, left-circular polarization, or the like. In one embodiment described herein with reference to the Figures, an optical element such as a polarizer aligned to the first polarization state means the orientation of the polarizer that passes the p-polarization state of light, and reflects or absorbs the second polarization state (in this case the s-polarization state) of light. It is to be understood that the polarizer can instead be aligned to pass the s-polarization state of light, and reflect or absorb the p-polarization state of light, if desired.

One factor that impacts the pocket projector market is the high cost of the projectors, especially if the projectors are battery powered. LCOS based projectors have the potential of being low-cost because the imager can be manufactured using the techniques of semiconductor manufacturing. Being based on polarization switching, these projectors require polarization control components such as polarizing beam splitters (PBS), polarization conversion systems (PCS), and conventional optical components such as color combiners (CC) and tapered light guides. Many of these components are currently assembled by hand and can be quite expensive. The present disclosure provides a path to reduce the cost of these components by as much as an order of magnitude. Such a reduction in cost could make LCOS projectors the clear low-cost winner in the pocket projector marketplace.

In one aspect, the present disclosure provides a contiguous array of optical components and a technique for making them. This technique has the potential to dramatically reduce cost and waste, and also to substantially improve yield. In one particular embodiment, an array of polarizing beam splitters is fabricated through a machining approach, in which a two dimensional array of prism halves is machined out of a sheet. A second array is also machined out of another sheet. In some cases, the second array can be an identical and symmetrical to the first array. The sheets are adhered together with a substrate film, such as an intermediate layer of optically functional material (such as a dichroic coating, a multilayer optical film (MOF), a retarder, and the like) sandwiched between them. The resulting two dimensional array of optical components can then be used in aggregate, or rendered into individual optical components through a singulating process.

In one particular embodiment a substrate film is laminated between the two sheets forming a "sandwich", before machining the sheets. After the lamination step, the top side of the "sandwich" is milled to give prismatic shaped rods. A special chuck is then built, and the second side of the sandwich is milled. After that, crosscuts can be made to create individual PBSs. A thin layer of the sheet and the substrate film can continue to hold the individual PBSs together. In some embodiments, either at this point or before the crosscuts, the array of prisms can be antireflection (AR) coated. In some cases, the process can instead include machining the sheets first and then laminating the substrate film between the sheets after the machining has been completed. This approach may give somewhat greater manufacturing flexibility.

In one particular embodiment, both the optical faces and the crosscuts can be milled in the sheet before the sheet is assembled into a sandwich. A thin layer of material (e.g., a "land" region) remains at the base of the sheet after machining and can serve to hold all of the prisms together so that they remain intact for further processing. This allows for the sheets to be glued to the substrate film, for example a multilayer optical film (MOF), cleanly and without overspill of the adhesive onto the sides of the prisms. In order to glue the sheet to the MOF, any effective technique may be used. In one particular embodiment, the MOF can be releasably attached onto a flat surface, and the required amount of adhesive placed on top of the MOF, whose extent may be larger than the sheet. The sheet can then be placed on top of the pool of adhesive causing the adhesive to flow out to the edges of the sheet. The adhesive can then be cured or set (e.g., UV or thermal cured). Because of the thin layer of material connecting each of the prisms, the faces of the half prisms do not contact the adhesive. This can eliminate the typical adhesive cleanup steps associated with manual assembly of individual prisms. In some cases, a pressure sensitive adhesive (PSA) can be applied to either the MOF or the machined prism sheet, and then laminated.

After the first sheet is adhered to the MOF, the sheet and the MOF can be peeled away from the flat surface to which the MOF was releasably attached. This construction can then be placed MOF side up and a second quantity of adhesive can be placed on to the opposite side of the MOF. After this, the second sheet can be placed on top of the MOF, and again the adhesive will flow out to the edges, and can then be cured. Alignment features can be provided in each of the sheets to permit reliable alignment of the prisms as the second sheet is adhered to the MOF/first sheet construction.

Figure 1A:
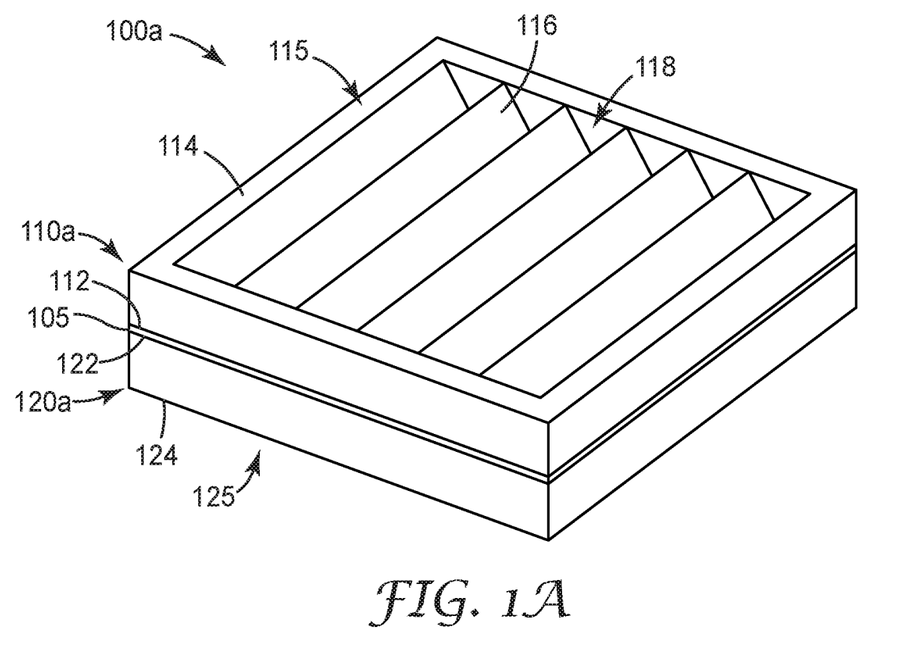
FIGS. 1A-1E shows a perspective schematic view of steps of a representative technique to produce an optical component array.

FIGS. 1A-1E show a perspective schematic view of steps of a representative technique to produce an optical component array, according to one aspect of the disclosure. In FIG. 1A, optical component array precursor 100a can be a polarizing beam splitter (PBS) array precursor 100a that results in a PBS array as described throughout the following description. PBS array precursor 100a includes a first sheet 110a having a first major surface 112, and an opposing second major surface 114. A plurality of parallel vee-shaped ridges 116 that can be described as "prism rods" are machined in the opposing second major surface 114, resulting in a series of first parallel grooves 118 separating adjacent parallel vee-shaped ridges 116. It is to be understood that machined cross-sections other than vee-shaped ridges may be used for other optical components; however, for the preparation of PBS arrays, vee-shaped ridges can be preferred. An optional first frame 115 can surround the first sheet 110a to provide additional supporting strength to the structure. A substrate 105 is adhered to the first major surface 112 of first sheet 110a. In a similar manner, a second sheet 120a having a first major surface 122 and an opposing second major surface 124 can include similar machined structures, as described elsewhere. The first major surface 122 of second sheet 120a is also adhered to substrate 105, forming a laminate.

The first and second sheets 110a, 120a, can be any suitable polymer or glass that can be machined, such as visible-light transparent polymers and low birefringent glasses useful for optical components. In some cases, optical quality glass such as those available from Schott Optical Glass, Duryea PA can be particularly useful. In one particular embodiment, polymers which can exhibit low birefringence including cell cast acrylic, polycarbonate, cyclo-olefin copolymers, and the like. Cast acrylic polymers including Spartech Polycast® (available from Spartech Corp., Clayton, Mo.), Evonik Acrylite® GP (available from Evonik Cyro LLC, Parsippany, NU), Reynolds R-Cast™ (available from Reynolds Polymer Technology, Grand Junction, CO) and Plexiglas® G (available from Arkema Inc., Briston, Pa.). Cell cast acrylic polymers can be preferred, since they can be readily machined providing a smooth surface, minimal thermal effects from machining operations, and low birefringence. Although the disclosure that follows refers to the use of polymeric sheets (e.g., as the first and second polymeric sheets 110a, 120a described below with reference to FIG. 1A), it is to be understood that glass sheets can instead be used to produce any of the optical component arrays described herein.

Substrate 105 can be any suitable substrate that can be affixed to, adhered to, or stably sandwiched between the first and second polymer sheets 110a, 120a. In some cases, substrate 105 can be affixed or adhered over substantially the entire surface; however, in some cases only a portion of the surface may be affixed or adhered. Substrate 105 can serve a dual purpose. In some cases, substrate 105 can impart a physical property such as strength to the optical component array such that machining operations can be reliably executed. In some cases, substrate 105 can be a portion of the optical component that imparts an optical property such as polarization to the component. In one particular embodiment, substrate 105 can be a multilayer dielectric film including inorganic films and coatings or multilayer film stacks; organic films such as polymeric films, polymeric film laminates, and multilayer polymeric films including polarizers such as reflective polarizers and absorbing polarizers; polarizers including polymeric multilayer optical film polarizers, McNeill polarizers, and wire-grid polarizers; retarders including quarter-wave retarders and half-wave retarders; films or coatings such as organic or inorganic dichroic reflectors and absorbers; and combinations thereof. In some cases, substrate 105 can be a coating or a layer that may be deposited by techniques including a vapor deposition technique such as sputtering or chemical vapor deposition, or a liquid deposition technique such as coating or spraying, onto one or both of the first and second polymeric sheets 110a, 120a. In some cases, an adhesive can be used to adhere the first and second polymeric sheets 110a, 120a together, having the deposited coating or layer between them.

In one particular embodiment, the substrate 105 is laminated between the first and second polymeric sheets 110a, 120a, before machining, for example by using a suitably clear adhesive, such as an optical adhesive. In this embodiment, after the lamination step, the opposing second major surface 114 of the first polymeric sheet 110a "sandwich" is milled to give the first plurality of vee-shaped ridges 116 (i.e., prism-shaped rods). A special chuck may then be used to secure the machined structure, and then the second side of the sandwich (i.e., the opposing second major surface 124 of the second polymeric sheet 120a) is milled.

In one particular embodiment, the plurality of parallel vee-shaped ridges 116 can instead be machined into first polymeric sheet 110a prior to attaching the substrate 105 and the second polymeric sheet 120a. In this embodiment, either the second polymeric sheet 120a can also be machined prior to attaching to the substrate 105 with attached first polymeric sheet 110a, or the second polymeric sheet 120a can be machined after attaching to the substrate 105 with attached first polymeric sheet 110a. In some cases, the substrate 105 can include a perimeter and an optional first frame 115 disposed adjacent the perimeter of the surface of the substrate 105, an optional second frame 125 disposed adjacent the perimeter of the opposing surface of the substrate 105, and registration features (not shown) disposed and aligned within each of the optional first frame 115 and the optional second frame 125. Optional first frame 115 can be integral with the first polymeric sheet 110a, and optional second frame 125 can be integral with the second polymeric sheet 120a.

Figure 1B:
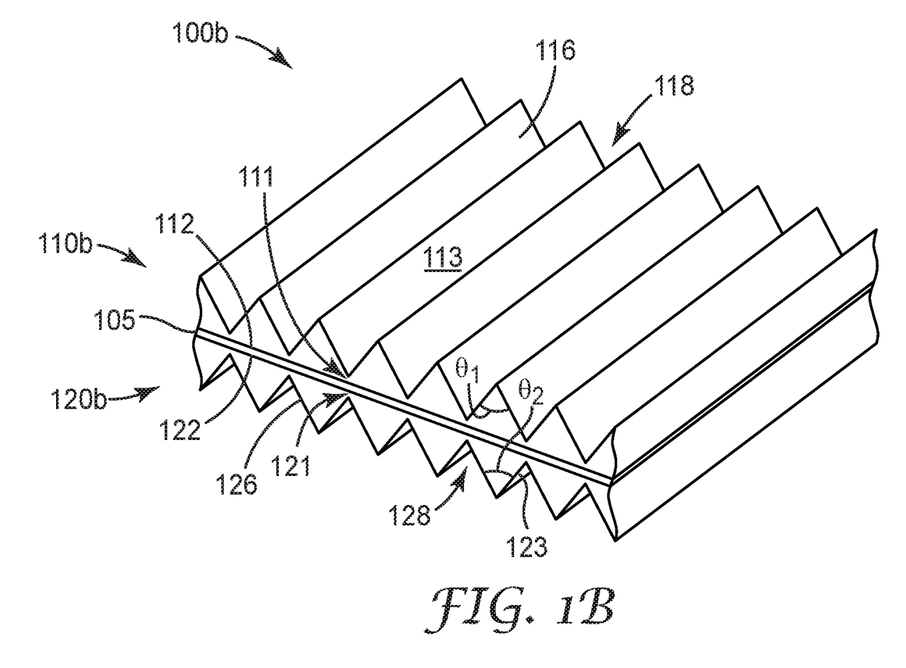

In FIG. 1B, PBS array precursor 100b includes a first polymeric sheet 110b having a first major surface 112, a first plurality of parallel vee-shaped ridges 116 each having a first plurality of prism surfaces 113, and a plurality of first parallel grooves 118 separating adjacent first parallel vee-shaped ridges 116. In FIG. 1B, optional first frame 115 of FIG. 1A has been removed to more clearly show the fabrication of the PBS array from the PBS array precursor 100b. An included first prism angle θ1 in each of the parallel vee-shaped ridges 116 can be any desired angle, depending on the optical component being fabricated. In one particular embodiment, where a PBS array is being fabricated, the included first prism angle θ1 can be 90 degrees as shown in the figure.

A first polymeric land region 111 can connect adjacent first parallel vee-shaped ridges 116, for example to provide additional support and strength to the PBS array precursor 100b, and also to protect the machined surfaces from any adhesive applied during fabrication, as described elsewhere. The first polymeric land region 111 may also serve to make the process of singulation into individual components less complex. Substrate 105 is adhered to the first major surface 112 of first polymeric sheet 110b, and first polymeric land region 111 separates the bottom of first parallel grooves 118 from the substrate 105. The first polymeric land region 111 can have any desired thickness and can extend for any desired distance between adjacent first parallel vee-shaped ridges 116. In some cases, the first polymeric land region 111 can be a flat region parallel to the substrate and between the adjacent vee-shaped ridges 116.

In a similar manner, a second polymeric sheet 120b having a first major surface 122 includes a second plurality of parallel vee-shaped ridges 126 each having a second plurality of prism surfaces 123, and a plurality of second parallel grooves 128 separating adjacent second parallel vee-shaped ridges 126. An included second prism angle θ2 in each of the parallel vee-shaped ridges 126 can be any desired angle, depending on the optical component being fabricated. In one particular embodiment, where a PBS array is being fabricated, the included second prism angle θ2 can be 90 degrees as shown in the figure.

As one of skill in the art would realize, it is to be understood that the first prism angle θ1 and/or the second prism angle θ2, can have any desired orientation relative to the respective first major surfaces 112, 122, depending on the optical component being fabricated. In some cases (not shown), for example, at least one of the first or second parallel vee-shaped ridges 116, 126, can have one or more of the first and/or second prism surface 113, 123 that is essentially perpendicular to the respective first major surface 112, 122. In this case, a corresponding adjacent prism surface of the first or second parallel vee-shaped ridges 116, 126 disposed at the first prism angle θ1 and/or the second prism angle θ2 relative to the first and/or second prism surface 113, 123, resulting in a "saw tooth" type pattern of parallel vee-grooves.

A second polymeric land region 121 can connect adjacent second parallel vee-shaped ridges 126, for example to provide additional support and strength to the PBS array precursor 100b, and also to protect the machined surfaces from any adhesive applied during fabrication, as described elsewhere. The second polymeric land region 121 may also serve to make the process of singulation into individual components less complex. Substrate 105 is adhered to the first major surface 122 of second polymeric sheet 120b, and second polymeric land region 121 separates the bottom of second parallel grooves 128 from the substrate 105. The second polymeric land region 121 can have any desired thickness and can extend for any desired distance between adjacent second parallel vee-shaped ridges 126. In some cases, the second polymeric land region 121 can be a flat region parallel to the substrate and between the adjacent vee-shaped ridges 126. Each of the first and second plurality of parallel vee-shaped ridges 116, 126 are aligned to be parallel to each other and such that the first and second polymeric land regions 111, 121, are immediately opposite the substrate from each other. One having skill in the art will recognize that the placement of features (e.g., grooves and ridges) of the second polymeric sheet 120b with respect to features on the first polymeric sheet 110b are determined by the desired function of the component being constructed.

Each of the first plurality of prism surfaces 113 and the second plurality of prism surfaces 123 are machined by techniques that may provide an acceptable surface finish that requires no additional processing such as polishing prior to being used as an imaging PBS. In some cases, the machining technique can be diamond machining including, for example, radial fly-cutting, axial fly-cutting, high speed diamond end milling, or diamond grinding. The surface finish can be characterized by techniques including, for example, white light interferometry, stylus profilometry, confocal microscopy, or atomic force microscopy (AFM). While it is generally accepted that a surface has "optical quality" if its finish is better than 3 micro-inches (approximately 75 nm) peak-to-valley measurement, each optical application determines the actual acceptable requirement. In some cases, additional polishing can be performed if desired, including for example polishing using a technique comprising mechanical polishing, flame polishing, vapor polishing, or a combination thereof.

Figure 1C:
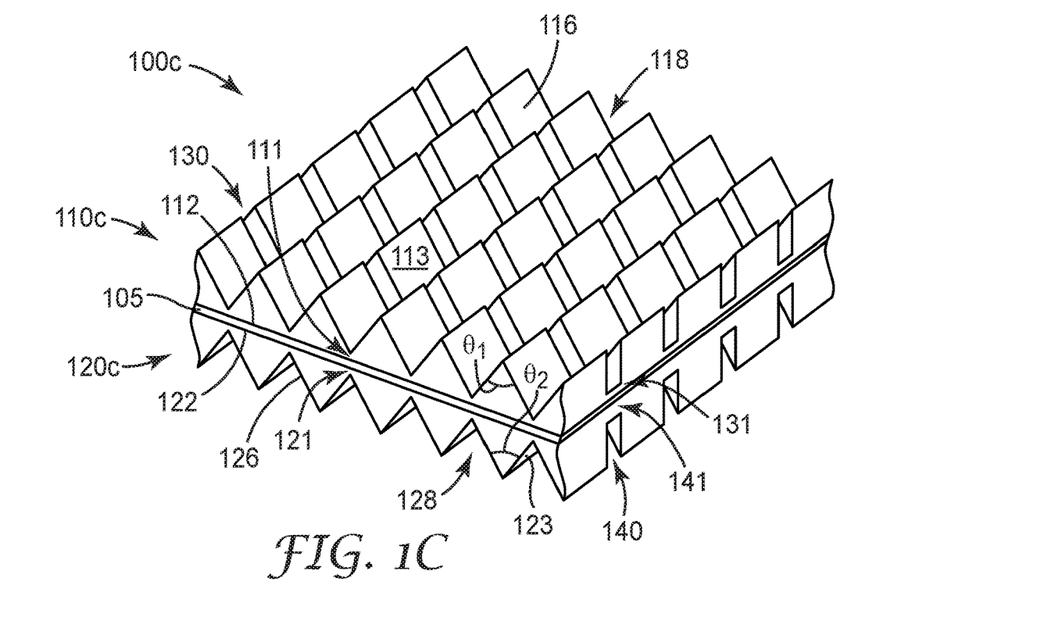

In FIG. 1C, PBS array precursor 100c shows the PBS array precursor 100b of FIG. 1B with additional features described below. Each of the elements 105-128 shown in FIG. 1C correspond to like-numbered elements 105-128 shown in FIGS. 1A-1B, which have been described previously. For example, substrate 105 of FIG. 1C corresponds to substrate 105 of FIGS. 1A-1B, and so on. PBS array precursor 100c includes a first polymeric sheet 110c and second polymeric sheet 120c. A first plurality of parallel crosscuts 130 having a depth that leaves a first crosscut land region 131 between the bottom of each parallel crosscut 130 and substrate 105, are made to be perpendicular to first plurality of parallel vee-shaped ridges 116 in first polymeric sheet 110c. Further, a second plurality of parallel crosscuts 140 having a depth that leaves a second crosscut land region 141 between the bottom of each parallel crosscut 140 and substrate 105, are made to be perpendicular to second plurality of parallel vee-shaped ridges 126 in second polymeric sheet 120c. Each of the first and second plurality of parallel crosscuts 130, 140, can be made by any suitable technique including, for example, fly-cutting, laser ablating, sawing, milling, and the like. Further, it is to be understood that although the first and second plurality of parallel crosscuts 130, 140, are shown as being perpendicular to the respective first and second parallel vee-shaped ridges 116, 126, the first and second plurality of parallel crosscuts 130, 140, could instead be made at any desired angle to them.

Figure 1D:
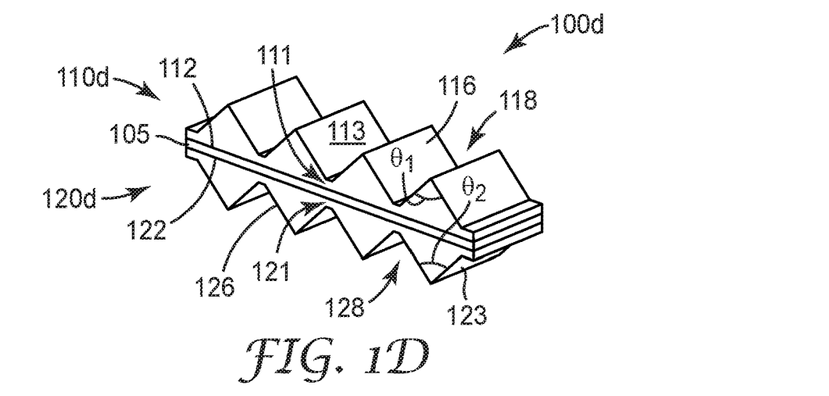

In FIG. 1D, PBS linear array precursor 100d shows a portion of the PBS array precursor 100c of FIG. 1C with additional features described below. Each of the elements 105-128 shown in FIG. 1D corresponds to like-numbered elements 105-128 shown in FIGS. 1A-1C, which have been described previously. For example, substrate 105 of FIG. 1D corresponds to substrate 105 of FIGS. 1A-1C, and so on. PBS linear array precursor 100d includes a first polymeric linear array 110d and second polymeric linear array 120d. Each of the first and second plurality of parallel crosscuts 130, 140, as shown in FIG. 1C have been completed to sever substrate 105 and first and second crosscut land regions 131, 141, leaving first polymeric linear array 110d and second polymeric linear array 120d. Each of the completion cuts can be made by any suitable technique including, for example, fly-cutting, laser ablating, sawing, milling, and the like.

Figure 1E:
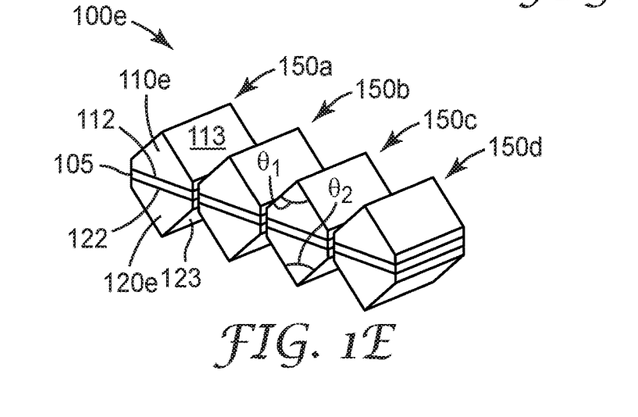

In FIG. 1E, singulated PBS array 100e shows a portion of the PBS linear array precursor 100d of FIG. 1D with additional features described below. Each of the elements 105-128 shown in FIG. 1E corresponds to like-numbered elements 105-128 shown in FIGS. 1A-1D, which have been described previously. For example, substrate 105 of FIG. 1E corresponds to substrate 105 of FIGS. 1A-1D, and so on. Singulated PBS array 100e includes a first through a fourth PBS 150a-150d that result when first polymeric linear array 110d and second polymeric linear array 120d are singulated by severing substrate 105 and the first and second polymeric land regions 111 and 121 located at the base of the plurality of first parallel grooves 118. Each of the completion cuts can be made by any suitable technique including, for example, fly-cutting, laser ablating, sawing, milling, and the like.

Figure 2A:
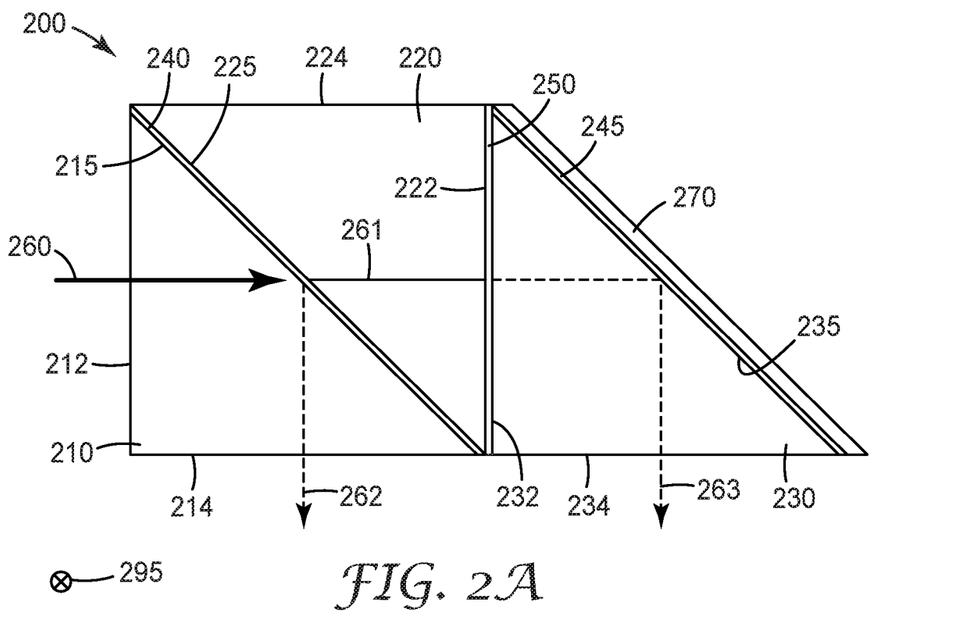
FIG. 2A shows a cross-sectional schematic of an optical component.

FIG. 2A shows a cross-sectional schematic of an optical component such as a polarization conversion system (PCS) 200, according to one aspect of the disclosure. PCS 200 can be used to convert unpolarized light to light of a single polarization state, as described below. PCS 200 includes a first prism 210 having a first diagonal surface 215, an input surface 212, and an output surface 214; a second prism 220 having a second diagonal surface 225, an output surface 222, and a side surface 224; and a third prism 230 having a third diagonal surface 235, an input surface 232, and an output surface 234. A first reflective polarizer 240 is disposed between the first and second prisms 210, 220, for example by use of an optical adhesive between the first diagonal surface 215 and the second diagonal surface 225. The first reflective polarizer 240 can be aligned to a first polarization direction 295 such that one polarization state (e.g., the p-polarization state) is transmitted through the first reflective polarizer 240 and an orthogonal polarization state (e.g., the s-polarization state) is reflected from the first reflective polarizer 240.

In a similar manner, a second reflective polarizer 245 (or alternately a suitable broadband reflector) can be disposed on the third diagonal surface 235 of the third prism 230, and a half-wave retarder 250 can be disposed between the second prism 220 and the third prism 230. Each of the second reflective polarizer 245 and the half-wave retarder 250 can be adhered to the respective component by use of an optical adhesive. In one particular embodiment, the second reflective polarizer 245 can also be aligned to the first polarization direction 295, as described elsewhere. In some cases, an optional protective coating 270 can be adhered to the second reflective polarizer 245, if desired.

In operation, an unpolarized light 260 enters the first prism 210 and intercepts first reflective polarizer 240 where it is split into a transmitted p-polarized light 261 and a reflected s-polarized light 262 which exits the PCS 200. The transmitted p-polarized light 261 passes through second prism 220, rotates to transmitted s-polarized light 263 as it passes through half-wave retarder 250, enters third prism 230, reflects from second reflective polarizer 245, and exits PCS 200 as transmitted s-polarized light 263.

The PCS 200 can be fabricated using traditional techniques, and entails handling and proper alignment of several precise, small optical elements including the individual first and second reflective polarizers 240, 250, half-wave retarder 250, and first and second prisms 210, 220. Several steps are required to assemble the PCS 200, typically by hand, and since this traditional fabrication requires the use of an optical adhesive to assemble the PCS, damage can often occur to the optical element.

Figure 2B:
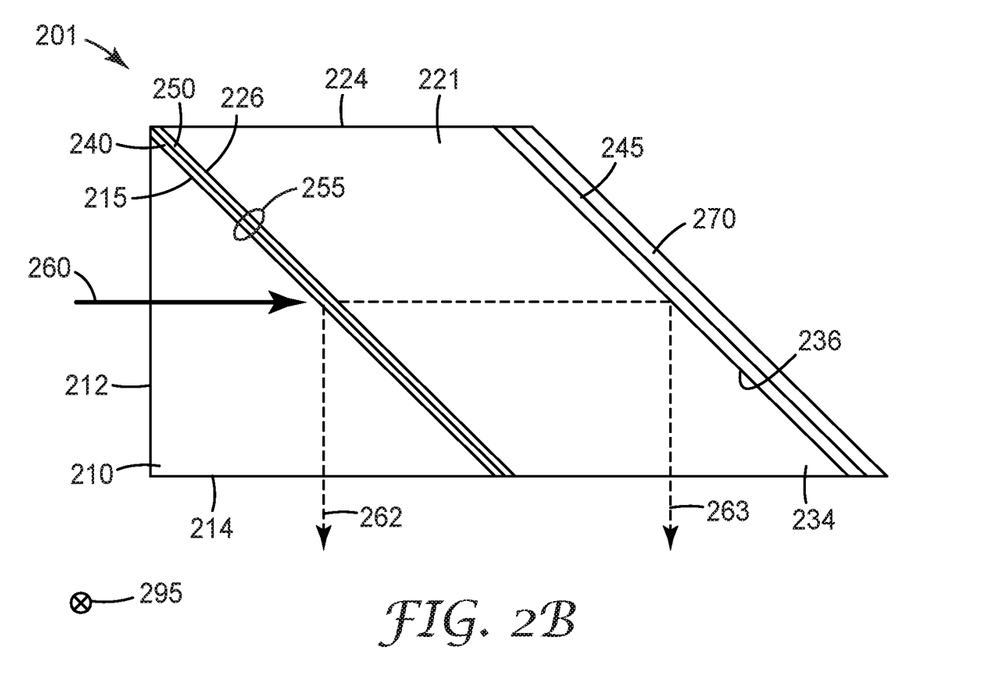
FIG. 2B shows a cross-sectional schematic of an optical component.

FIG. 2B shows a cross-sectional schematic of an optical component such as a polarization conversion system (PCS) 201, according to one aspect of the disclosure. PCS 201 can be used to convert unpolarized light to light of a single polarization state, in a manner similar to that described for PCS 200 in FIG. 2A. Each of the elements 210-295 shown in FIG. 2B corresponds to like-numbered elements 210-295 shown in FIG. 2A, which have been described previously. For example, first prism 210 of FIG. 2B corresponds to first prism 210 of FIG. 2A, and so on.

PCS 201 includes a first prism 210 having a first diagonal surface 215, an input surface 212, and an output surface 214; a rhombus 221 having a second diagonal surface 226, a side surface 224, an output surface 234, and a third diagonal surface 236. A reflective polarizer laminate 255 is disposed between the first diagonal surface 215 of the first prism 210 and the second diagonal surface 226 of the rhombus 221. The reflective polarizer laminate 255 includes a first reflective polarizer 240 and a half-wave retarder 250, and the reflective polarizer laminate 255 is positioned such that the first reflective polarizer 240 is immediately adjacent the first diagonal surface 215. Each of the layers of the reflective polarizer laminate 255 can be adhered to their respective adjacent optical elements, by use of an optical adhesive. The first reflective polarizer 240 can be aligned to a first polarization direction 295 such that one polarization state (e.g., the p-polarization state) is transmitted through the first reflective polarizer 240 and an orthogonal polarization state (e.g., the s-polarization state) is reflected from the first reflective polarizer 240.

In a similar manner, a second reflective polarizer 245 (or alternately a suitable broadband reflector) can be disposed on the third diagonal surface 236 of the rhombus 221. The second reflective polarizer 245 can be adhered to the third diagonal surface 236 by use of an optical adhesive. In one particular embodiment, the second reflective polarizer 245 can also be aligned to the first polarization direction 295, as described elsewhere. In some cases, an optional protective coating 270 can be adhered to the second reflective polarizer 245, if desired. It is to be noted that the rhombus 221 of FIG. 2B corresponds to a combination of the second prism 220 and third prism 230 shown in FIG. 2A, with re-positioning of the half-wave retarder 250.

In operation, an unpolarized light 260 enters the first prism 210 and intercepts first reflective polarizer 240 where it is split into a reflected s-polarized light 262 and a transmitted p-polarized light that passes through the half-wave retarder 250 becoming a transmitted s-polarized light 263. The reflected s-polarized light 262 exits the PCS 201. The transmitted s-polarized light 263 passes through rhombus 221, reflects from second reflective polarizer 245, and exits PCS 200 as transmitted s-polarized light 263. The PCS 201 can be fabricated using the optical component array technique described herein, and eliminates many of the problems described above regarding traditional assembly techniques.

In one particular embodiment, the fabrication of any optical component array can begin with a planar optical stack that comprises an adhesive, a plastic such as a visible-light transparent plastic, a glass, a dichroic coating, a scattering material, a reflective polarizer, an absorbing polarizer, a multilayer optical film, a retarder, a reflector, a retro reflector, a microstructured material, a lenticular structured material, a Fresnel structured material, an absorber, or a combination thereof. The planar optical stack can be arranged as needed to produce the desired optical component, and then be subject to the machining steps described herein. It is to be understood that the fabrication of an array of optical components can include combining the result of several array fabrication steps, such as lamination of a first array of 3-dimensional structures to a second array of 3-dimensional structures. In some cases, such a combination can include combining a first singulated element, linear array, or rectangular array of a first component with a second singulated element, linear array, or rectangular array of a second component. Included below is a representative fabrication technique for an optical component array of PCS components, which includes a combination of linear or rectangular arrays of components to form a monolithic array of components that can be singulated to result in individual PCS components.

Figure 3A:
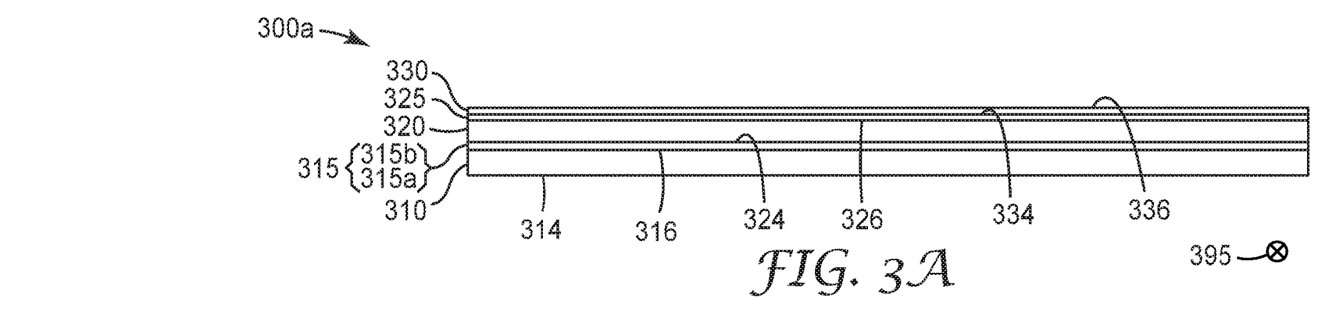
FIGS. 3A-3F show a cross-sectional schematic view of a representative technique to produce an optical component array.

FIGS. 3A-3F show a cross-sectional schematic view of a representative technique to produce an optical component array, such as an array of PCS components useful in projection displays, according to one aspect of the disclosure. FIG. 3A shows a PCS precursor laminate 300a that includes a first acrylic sheet 310 having a first major surface 314 and a second major surface 316. A first substrate 315 is laminated to the second major surface 316 of the first acrylic sheet 310, for example using an optical adhesive. First substrate 315 can be a laminate of a reflective polarizer 315a and a half-wave retarder 315b disposed so that the reflective polarizer 315a is immediately adjacent second major surface 316 of first acrylic sheet 310. The reflective polarizer 315a is aligned to a first polarization direction 395, thereby transmitting first polarization direction 395 and reflecting an orthogonal second polarization of light. The half-wave retarder 315b is aligned to efficiently rotate the transmitted first polarization direction light 395 to the orthogonal second polarization direction light.

A second acrylic sheet 320 having a first major surface 324 and a second major surface 326 is adhered, for example using an optical adhesive, to the first substrate 315 such that the first major surface 324 and half-wave retarder 315b are adjacent each other. A second reflective polarizer 325 aligned to the first polarization direction 395, is adhered using an optical adhesive to the second major surface 326 of the second acrylic sheet 320. Those of skill in the art would understand that the second reflective polarizer 325 may also be a reflector, such as a simple broadband reflector, since only reflection and not any polarization discrimination takes place from second reflective polarizer 325. A third acrylic sheet 330 having a first major surface 334 and a second major surface 336 is then disposed on the second reflective polarizer 325 such that the first major surface 334 is adjacent the second reflective polarizer 325. The third acrylic sheet 330 can also be laminated using an optical adhesive.

Figure 3B:
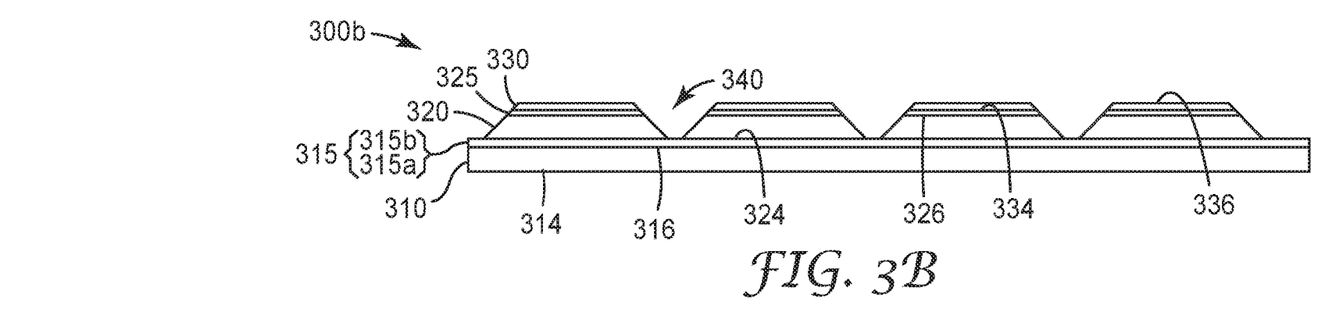

In FIG. 3B, a PCS precursor laminate 300b can be held in place securely using a vacuum chuck (not shown) or other suitable hold-down device affixed to first major surface 314 of first acrylic sheet 310. A plurality of first vee-grooves 340 are then milled through third acrylic sheet 330, second reflective polarizer 325, and second acrylic sheet 320, as described elsewhere. Each of the plurality of first vee-grooves 340 includes two sides that can be correlated with side surface 224 of PCS 201 as shown in FIG. 2B. At the bottom of each of the plurality of first vee-grooves 340, a land region (not shown) may remain to add strength to the structure, as described elsewhere.

Figure 3C:
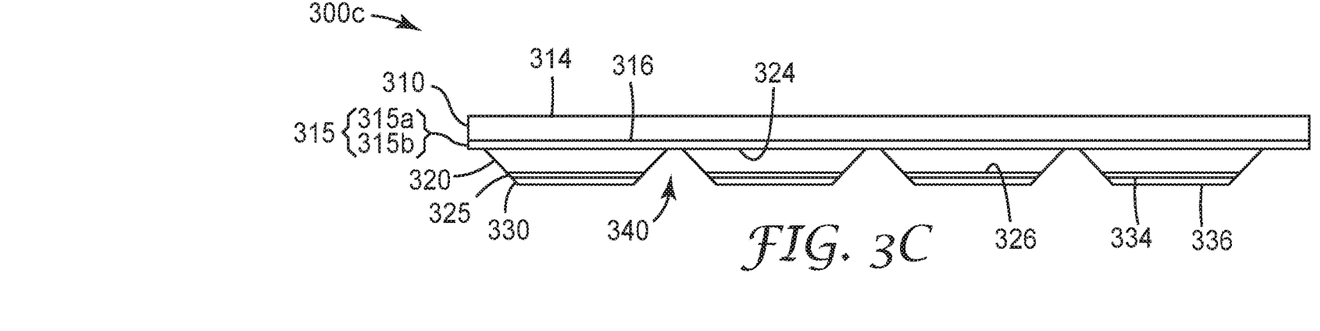

In FIG. 3C, a PCS precursor laminate 300c is the PCS precursor laminate 300b of FIG. 3B flipped over, and a vacuum chuck or other suitable hold-down device (not shown) is affixed to second major surface 336 of third acrylic sheet 330, or a similar hold-down device is applied to secure the PCS precursor laminate 300c.

Figure 3D:
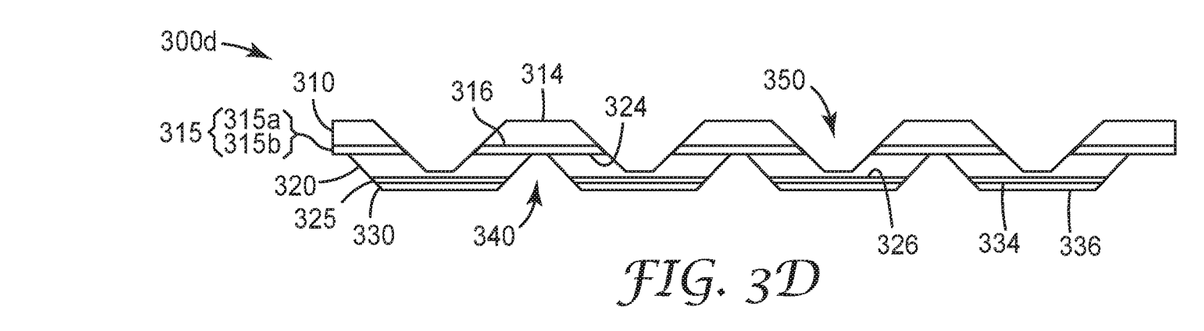

In FIG. 3D, a PCS precursor laminate 300d includes a plurality of second vee-grooves 350 which are then milled through first acrylic sheet 310, first substrate 315, and second acrylic sheet 320, as described elsewhere and shown in FIG. 3D. Each of the plurality of second vee-grooves 350 includes two sides that can be correlated with output surfaces 214 and 234 of PCS 201 as shown in FIG. 2B. At the bottom of each of the plurality of second vee-grooves 350, a land region (not shown) may remain to add strength to the structure, as described elsewhere.

Figure 3E:
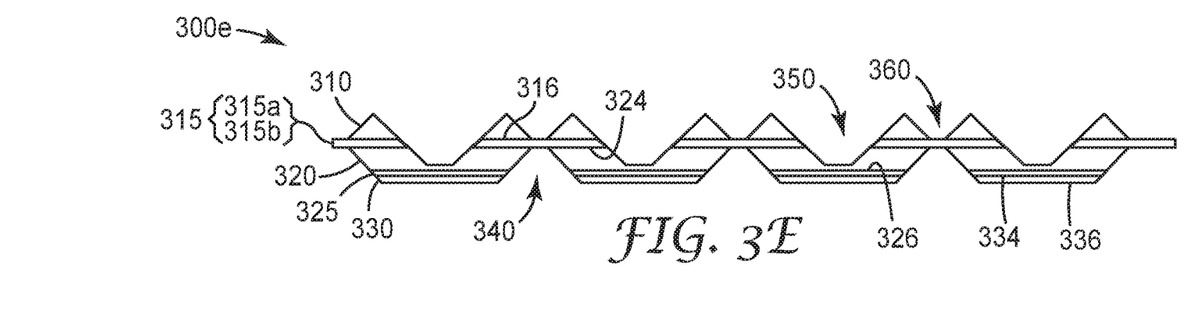

In FIG. 3E, a PCS precursor laminate 300e includes a plurality of third vee-grooves 360 which are then milled through first acrylic sheet 310, as described elsewhere and shown in FIG. 3E. Each of the plurality of third vee-grooves 360 includes two sides that can be correlated with input surface 212 of PCS 201 as shown in FIG. 2B. At the bottom of each of the plurality of third vee-grooves 360, a land region (not shown) may remain to add strength to the structure, as described elsewhere.

Figure 3F:
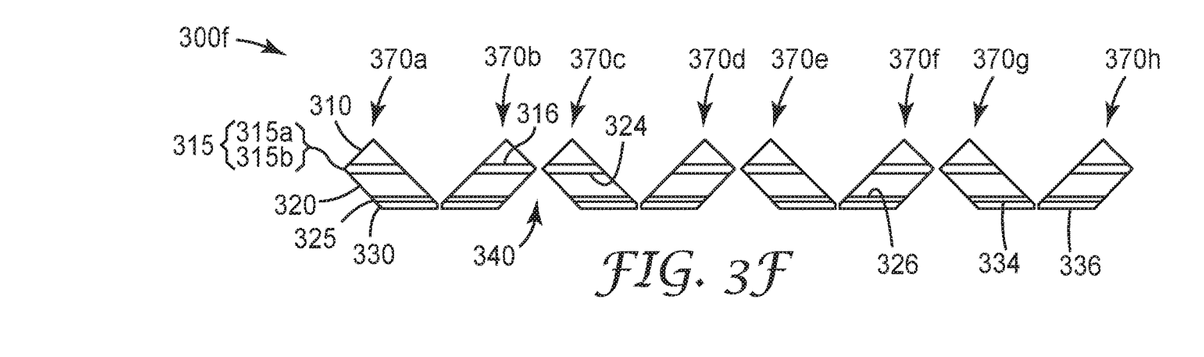

In FIG. 3F, a singulated PCS array 300f includes a plurality of individual PCS optical components 370a-370h that result when the PCS precursor laminate 300e of FIG. 3E is singulated by any of the techniques described elsewhere. Each of the individual PCS optical components 370a-370h can be compared to the PCS 201 of FIG. 2B.

Figure 4A:
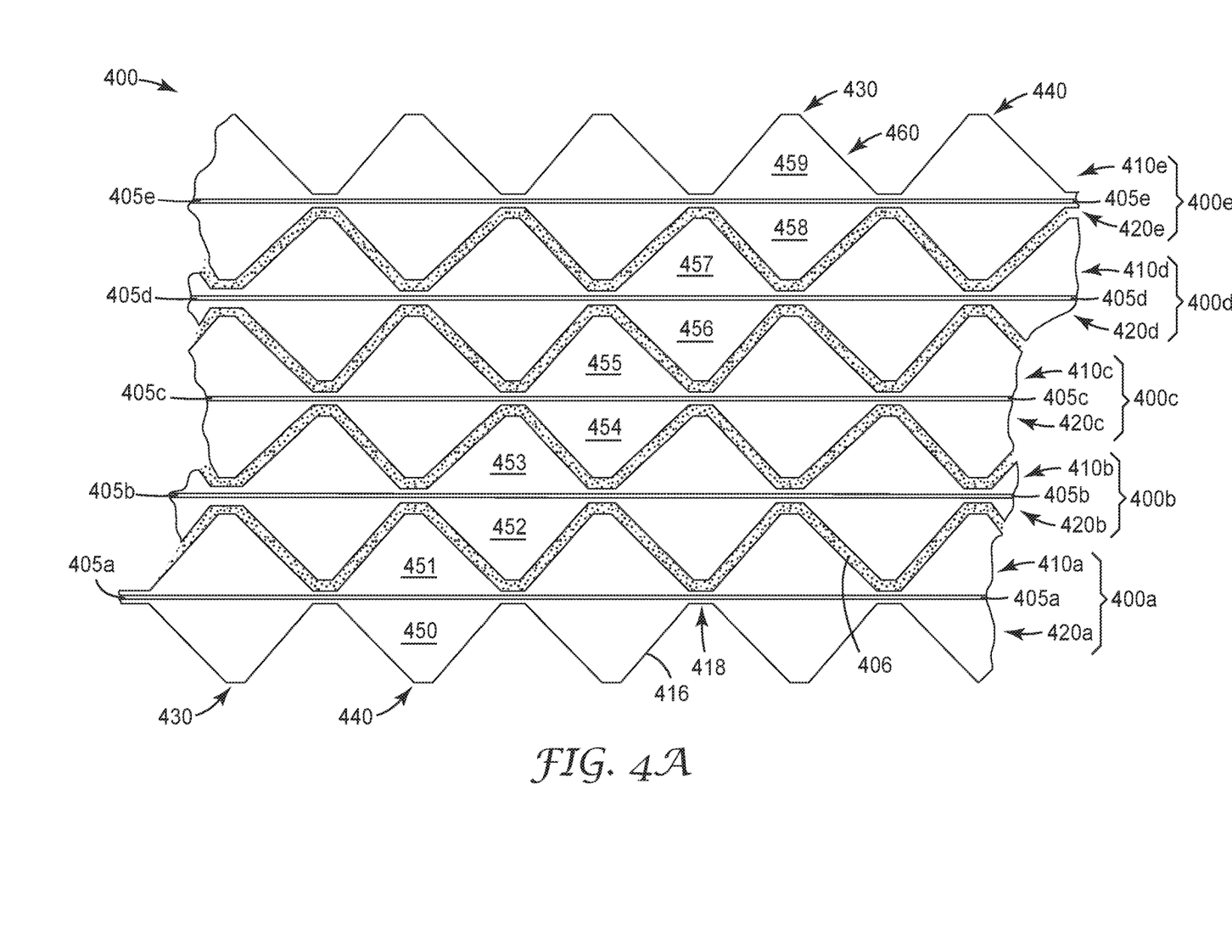
FIG. 4A shows a cross-sectional schematic view of a representative technique to produce an optical component monolith including a plurality of optical component arrays.

FIG. 4A shows a cross-sectional schematic view of a representative technique to produce an optical component monolith 400 including a plurality of optical component arrays, according to one aspect of the disclosure. In one particular embodiment, optical component monolith 400 can be used to produce a plurality of tilted dichroic color combiners with a polarization conversion feature, as described below, and includes several optical component linear arrays similar to the PBS linear array precursor 100d shown in FIG. 1D. It is to be understood that although the description provided below is specific to producing a three color combiner having a polarized white light output, any desired modification can be made to the various components and component orientation to produce any desired optical component, as known to one of skill in the art.

It is to be understood that the description that follows is directed to assembling a plurality of optical component linear arrays similar to the PBS linear array precursors 100d into a monolith 400 and separating the individual PCS optical components from the monolith by cutting as described elsewhere. However, the monolith 400 can instead be formed using several alternative optical component arrays. In one particular embodiment, a plurality of optical component arrays similar to the PBS array precursor 100c shown in FIG. 1C can instead be assembled by stacking and adhering into a first array monolith (not shown). In one particular embodiment, a plurality of optical component arrays similar to the PBS array precursor 100b shown in FIG. 1B can instead be assembled by stacking and adhering into a second array monolith (not shown). In these embodiments, the assembled first or second array monoliths can be separated using any of the cutting, sawing, or milling techniques described herein, and one of skill in the art would realize that the PCS optical component can be singulated by performing a first series of cuts to separate the respective first or second array monolith into the monolith 400 assembled from the linear array precursors, and second cuts as described below. Generally, each of the arrays can be adhered together using a suitable optical adhesive that can be infused between the stacked precursor arrays using a known technique similar to that used to fill a liquid crystal display with LCD material.

Optical component monolith 400 includes a first optical component linear array 400a, a second optical component linear array 400b, a third optical component linear array 400c, a fourth optical component linear array 400d, and a fifth optical component linear array 400e. Each of the first through fifth optical component linear arrays 400a-400e are nested together as shown in FIG. 4A, such that a ridge 416 and a groove 418 adjacent each other can be affixed together with an adhesive 406 disposed between them. In one particular embodiment shown in FIG. 4A, the peaks of each ridge 416 can be shaped such that the ridge 416 and groove 418 can be closely nested together when the optical component monolith 400 is compressed and adhered together. It is to be understood that one skilled in the art may choose an adhesive having a refractive index suitable for controlling the level of total internal reflection, thereby maximizing the efficiency of the component.

First optical component linear array 400a includes a first polymeric linear array 410a and a second polymeric linear array 420a with a red dichroic mirror film 405a disposed between them. First optical component linear array 400a can be produced in the manner described with reference to FIGS. 1A-1D by substituting the red dichroic mirror film 405a for the substrate 105, as described elsewhere.

Second optical component linear array 400b includes a third polymeric linear array 410b and a fourth polymeric linear array 420b with a green dichroic mirror film 405b disposed between them. Second optical component linear array 400b can be produced in the manner described with reference to FIGS. 1A-1D by substituting the green dichroic mirror film 405b for the substrate 105, as described elsewhere.

Third optical component linear array 400c includes a fifth polymeric linear array 410c and a sixth polymeric linear array 420c with a blue dichroic mirror film 405c disposed between them. Third optical component linear array 400c can be produced in the manner described with reference to FIGS. 1A-1D by substituting the blue dichroic mirror film 405c for the substrate 105, as described elsewhere.

Fourth optical component linear array 400d includes a seventh polymeric linear array 410d and an eighth polymeric linear array 420d with a reflective polarizer film laminate 405d disposed between them. In one particular embodiment, reflective polarizer film laminate 405d includes a reflective polarizer film laminated to a retarder such as a half-wave retarder. In the reflective polarizer film laminate 405, the reflective polarizer film can be aligned, for example, such that incident p-polarized light is reflected, and s-polarized light is transmitted through the half-wave retarder and converted to p-polarized light. Fourth optical component linear array 400d can be produced in the manner described with reference to FIGS. 1A-1D by substituting the reflective polarizer film laminate 405d for the substrate 105, as described elsewhere.

Fifth optical component linear array 400e includes a ninth polymeric linear array 410e and a tenth polymeric linear array 420e with a reflective polarizer film 405e disposed between them. In one particular embodiment, the reflective polarizer film can be aligned such that incident p-polarized light is reflected, and s-polarized film is transmitted. Fifth optical component linear array 400e can be produced in the manner described with reference to FIGS. 1A-1D by substituting the reflective polarizer film 405e for the substrate 105, as described elsewhere.

The optical component monolith 400 can then be cut with a first cut 430 and a second cut 440 such that a first through a tenth prism, 450-459, become a color combiner/polarization converter 460 separated from the remainder of the optical component monolith 400. Each of the first and second cuts 430, 440, can be made by any suitable technique including, for example, fly-cutting, laser ablating, sawing, milling, and the like, and if required, each surface the color combiner 460 can be polished, as known to one of skill in the art.

Figure 4B:
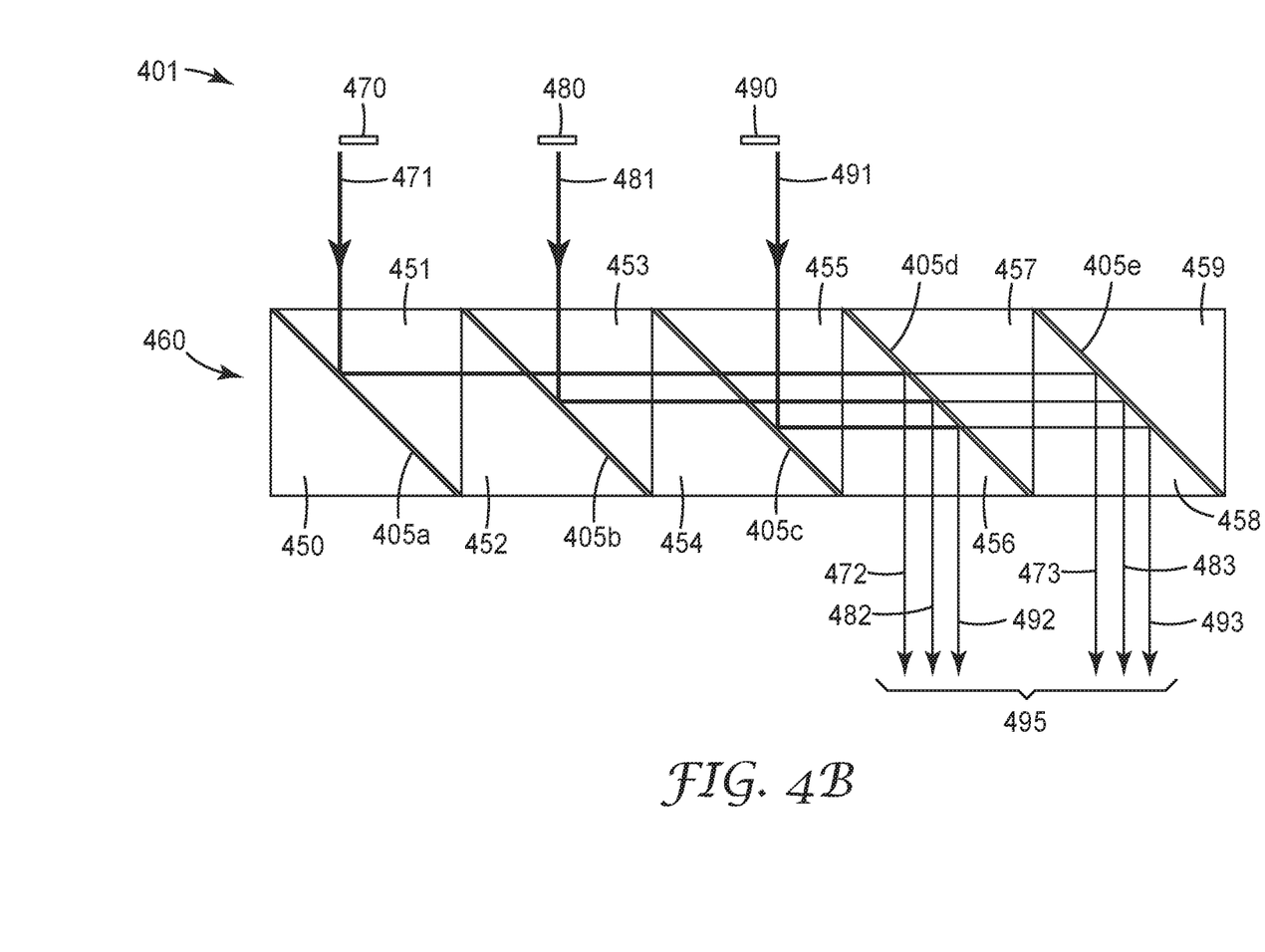
FIG. 4B shows a cross-sectional schematic view of a color combiner system produced by the technique of FIG. 4A.

FIG. 4B shows a cross-sectional schematic view of a color combiner/polarization converter system 401 produced by the technique of FIG. 4A. Color combiner/polarization converter system 401 includes the color combiner/polarization converter 460 described with reference to FIG. 4A and a first, a second, and a third light emitting diode (LED). First LED 470 injects an unpolarized red light 471 into second prism 451 where it reflects from red dichroic mirror film 405a, passes unchanged through green dichroic mirror film 405b and blue dichroic mirror film 405c, and intercepts reflective polarizer laminate 405d where it is split into a reflected p-polarized red light 472 and transmitted p-polarized red light 473, as described elsewhere. Reflected p-polarized red light 472 exits color combiner 460 through seventh prism 456. Transmitted p-polarized red light 473 reflects from reflective polarizer film 405e and exits color combiner 460 through ninth prism 458.

Second LED 480 injects an unpolarized green light 481 into fourth prism 453 where it reflects from green dichroic mirror film 405b, passes unchanged through blue dichroic mirror film 405c, and intercepts reflective polarizer laminate 405d where it is split into a reflected p-polarized green light 482 and transmitted p-polarized green light 483, as described elsewhere. Reflected p-polarized green light 482 exits color combiner 460 through seventh prism 456. Transmitted p-polarized green light 483 reflects from reflective polarizer film 405e and exits color combiner 460 through ninth prism 458.

Third LED 490 injects an unpolarized blue light 491 into sixth prism 455 where it reflects from blue dichroic mirror film 405c, and intercepts reflective polarizer laminate 405d where it is split into a reflected p-polarized blue light 492 and transmitted p-polarized blue light 493, as described elsewhere. Reflected p-polarized blue light 492 exits color combiner 460 through seventh prism 456. Transmitted p-polarized blue light 493 reflects from reflective polarizer film 405e and exits color combiner/polarization converter 460 through ninth prism 458. The combination of reflected and transmitted p-polarized red, green, and blue light (472, 473, 482, 483, 492, 493) collectively combine to become p-polarized white light 495.

Example

An optical component array was fabricated. In the first fabrication step, prism rods having an included angle of 90 degrees were machined into a cell cast acrylic sheet 0.5 inches (1.27 cm) thick, (available from McMaster-Carr, Princeton, N.J.), leaving a 0.15 mm thick and 3 mm wide land region between adjacent prism rods. After the milling process, a Vikuiti™ MOF reflective polarizer, available from 3M Company, was releasably disposed onto a sacrificial acrylic flat. A suitable quantity of Norland 75 UV Optical Adhesive (available from Norland Products, Cranbury N.J.) was deposited onto the MOF in a quantity sufficient to create a 100-200 μm layer across the entire extent of the milled sheet. The milled sheet was placed on top of the adhesive and the adhesive was allowed to flow out. The adhesive was then cured according to the manufacturer's instructions. The milled sheet with MOF adhered was then removed from the sacrificial flat. The removed MOF retained its flatness from its original disposition onto the sacrificial flat. The milled sheet/MOF construction was then turned MOF side up. A second quantity of adhesive was applied to the MOF surface and the second milled sheet was applied as before. Dowel pins were inserted into registration holes to properly align the two sheets. The adhesive was cured as before and the array of PBSs was complete. The array of PBSs were singulated into individual PBSs by breaking the individual PBSs loose and cutting the connecting film with a razor blade. The prism rods could also be crosscut using a suitable saw such as an optical saw with a diamond blade, or milled, or laser cut, without significant damage to the prism faces such as chipping or melting. The optical surfaces of the prisms were sufficiently good to minimize any reduction in resolution, and were judged to be suitably good for a projection application.

Following are a list of embodiments of the present disclosure.

Item 1 is a polarizing beamsplitter (PBS) array, comprising: a reflective polarizer; a plurality of first machined prisms each having a first diagonal surface adhered to a major surface of the reflective polarizer; and a plurality of second machined prisms each having a second diagonal surface adhered to an opposing major surface of the reflective polarizer, wherein each of the plurality of the first and the second machined prisms are aligned in registration with one another, forming a PBS array contiguous with the reflective polarizer.

Item 2 is the PBS array of item 1, wherein a first land region connects adjacent first machined prisms, and a second land region connects adjacent second machined prisms.

Item 3 is the PBS array of item 1 or item 2, wherein the first machined prisms and the second machined prisms each comprise a low-birefringent material.

Item 4 is the PBS array of item 3, wherein the low-birefringent material comprises an acrylic polymer, a polycarbonate polymer, a cyclo-olefin copolymer, or a glass.

Item 5 is the PBS array of item 4, wherein the acrylic polymer is a cast acrylic polymer.

Item 6 is the PBS array of item 1 to item 5, wherein the reflective polarizer comprises a polymeric multilayer optical film polarizer, a McNeill polarizer, or a wire-grid polarizer.

Item 7 is the PBS array of item 1 to item 6, wherein the plurality of first machined prisms and the plurality of second machined prisms each form a rectangular shaped array.

Item 8 is the PBS array of item 1 to item 7, wherein the machined prisms are polished using a technique comprising mechanical polishing, flame polishing, vapor polishing, or a combination thereof.

Item 9 is the PBS array of item 1 to item 8, wherein the reflective polarizer comprises a perimeter, and further comprising: a first frame disposed adjacent the perimeter of the major surface of the reflective polarizer, a second frame disposed adjacent the perimeter of the opposing major surface of the reflective polarizer, and registration features disposed and aligned within each of the first frame and the second frame.

Item 10 is an optical component array, comprising: a substrate film; a plurality of first machined prismatic structures each having a first prism surface adhered to a major surface of the substrate film; and a plurality of second machined prismatic structures each having a second prism surface adhered to an opposing major surface of the substrate film, wherein each of the plurality of the first and the second machined prismatic structures are aligned in registration with one another.

Item 11 is the optical component array of item 10, wherein opposing pairs of first and second machined prismatic structures form rectangular prismatic optical elements.

Item 12 is the optical component array of item 10 or item 11, wherein a first land region connects adjacent first machined prismatic structures, and a second land region connects adjacent second machined prismatic structures.

Item 13 is the optical component array of item 10 to item 12, wherein the first machined prismatic structures and the second machined prismatic structures each comprise a low-birefringent material.

Item 14 is the optical component array of item 13, wherein the low-birefringent material comprises an acrylic polymer, a polycarbonate polymer, or a cycloolefin copolymer.

Item 15 is the optical component array of item 14, wherein the acrylic polymer is cast acrylic.

Item 16 is the optical component array of item 10 to item 15, wherein the substrate film comprises an adhesive, a transparent plastic, a glass, a dichroic coating, a scattering material, a reflective polarizer, an absorbing polarizer, a multilayer optical film, a retarder, a reflector, a retro reflector, a microstructured material, a lenticular structured material, a fresnel structured material, an absorber, or a combination thereof.

Item 17 is the optical component array of item 10 to item 16, wherein the substrate film comprises a film laminate.

Item 18 is the optical component array of item 17, wherein the film laminate comprises at least two films selected from a multilayer dielectric film including inorganic films and coatings or multilayer film stacks; organic films such as polymeric films, polymeric film laminates, and multilayer polymeric films including polarizers such as reflective polarizers and absorbing polarizers; polarizers including polymeric multilayer optical film polarizers, McNeill polarizers, and wire-grid polarizers; retarders including quarter-wave retarders and half-wave retarders; and films or coatings such as organic or inorganic dichroic reflectors and absorbers.

Item 19 is the optical component array of item 10 to item 18, wherein the plurality of first machined prismatic structures and the plurality of second machined prismatic structures each form a rectangular shaped array.

Item 20 is the optical component array of item 10 to item 19, wherein the substrate film comprises a perimeter, and further comprising: a first frame disposed adjacent the perimeter of the major surface of the substrate film, a second frame disposed adjacent the perimeter of the opposing major surface of the substrate film, and registration features disposed and aligned within each of the first frame and the second frame.

Item 21 is an optical component array, comprising: a substrate film; a plurality of first machined structures each having a first surface adhered to a major surface of the substrate film and a first land region connecting adjacent first machined structures; and a plurality of second machined structures each having a second surface adhered to an opposing major surface of the substrate film, and a second land region connecting adjacent second machined structures, wherein each of the plurality of the first and the second machined structures are aligned such that at least a portion of the first land region and the second land region are aligned in registration to each other and separated by the substrate film.

Item 22 is the optical component array of item 21, wherein the first machined structures and the second machined structures each comprise a low-birefringent material.

Item 23 is the optical component array of item 22, wherein the low-birefringent material comprises an acrylic polymer, a polycarbonate polymer, a cyclo-olefin copolymer, or a glass.

Item 24 is the optical component array of item 23, wherein the acrylic polymer is cast acrylic.

Item 25 is the optical component array of item 21 to item 24, wherein the substrate film comprises an adhesive, a transparent plastic, a glass, a dichroic coating, a scattering material, a reflective polarizer, an absorbing polarizer, a multilayer optical film, a retarder, a reflector, a retro reflector, a microstructured material, a lenticular structured material, a fresnel structured material, an absorber, or a combination thereof.

Item 26 is the optical component array of item 21 to item 25, wherein the substrate film comprises a film laminate.

Item 27 is the optical component array of item 26, wherein the film laminate comprises at least two films selected from a multilayer dielectric film including inorganic films and coatings or multilayer film stacks; organic films such as polymeric films, polymeric film laminates, and multilayer polymeric films including polarizers such as reflective polarizers and absorbing polarizers; polarizers including polymeric multilayer optical film polarizers, McNeill polarizers, and wire-grid polarizers; retarders including quarter-wave retarders and half-wave retarders; and films or coatings such as organic or inorganic dichroic reflectors and absorbers.

Item 28 is the optical component array of item 21 to item 27, wherein the plurality of first machined structures and the plurality of second machined structures each form a rectangular array.

Item 29 is the optical component array of item 21 to item 24, wherein the substrate film comprises a perimeter, and further comprising: a first frame disposed adjacent the perimeter of the major surface of the substrate film, a second frame disposed adjacent the perimeter of the opposing major surface of the substrate film, and registration features disposed and aligned within each of the first frame and the second frame.

Item 30 is a method of making a PBS array, comprising: machining a first plurality of parallel vee-shaped ridges into a first sheet opposite a first planar surface, such that adjacent vee-shaped ridges are separated by a first land region; machining a second plurality of parallel vee-shaped ridges into a second sheet opposite a second planar surface, such that adjacent vee-shaped ridges are separated by a second land region; positioning a substrate film between the first planar surface and the second planar surface; aligning in registration the first plurality of parallel vee-shaped ridges with the second plurality of parallel vee-shaped ridges; and adhering the substrate film between the first planar surface and the second planar surface.

Item 31 is a method of making a PBS array, comprising: adhering a substrate film between a first sheet and a second sheet; machining a first plurality of parallel vee-shaped ridges into the first sheet, such that adjacent vee-shaped ridges are separated by a first land region; and machining a second plurality of parallel vee-shaped ridges into the second sheet, such that adjacent vee-shaped ridges are separated by a second land region and such that the first plurality of parallel vee-shaped ridges are aligned in registration with the second plurality of parallel vee-shaped ridges.

Item 32 is the method of item 30 or item 31, further comprising machining crosscuts into at least one of the first and second sheets at an angle to the first plurality of parallel vee-shaped ridges and the second plurality of parallel vee-shaped ridges.

Item 33 is the method of item 32, wherein the crosscuts are perpendicular to the first plurality of parallel vee-shaped ridges and the second plurality of parallel vee-shaped ridges Item 34 is a method of making an optical component array, comprising: machining at least two first grooves into a first sheet opposite a first planar surface, such that a first land region separates each first groove from the first planar surface; machining at least two second grooves into a second sheet opposite a second planar surface, such that a second land region separates each second groove from the second planar surface; positioning a substrate film between the first planar surface and the second planar surface; aligning in registration the at least two first grooves with the at least two second grooves; and adhering the substrate film between the first planar surface and the second planar surface.

Item 35 is a method of making an optical component array, comprising: adhering a substrate film between a first sheet and a second sheet; machining at least two first grooves into the first sheet, such that each of the at least two first grooves are separated from the substrate film by a first land region; and machining at least two second grooves into the second sheet, such that each of the at least two second grooves are separated from the sheet by a second land region, and such that the first land region and second land region are aligned in registration opposite the substrate film.

Item 36 is the method of any of item 30 to item 35, further comprising machining crosscuts perpendicular to the first and second land regions.

Item 37 is the method of any of item 30 to item 36, wherein machining comprises milling and fly-cutting.

Item 38 is the method of item 36 or item 37, further comprising machining crosscuts into at least one of the first and second sheets at an angle to the at least two first grooves and the at least two second grooves.

Item 39 is the method of item 37, wherein the crosscuts are perpendicular to the at least two first grooves and the at least two second grooves.

Item 40 is the method of any of item 30 to item 39, wherein machining comprises milling and fly-cutting.

Item 41 is the method of any of item 30 to item 40, wherein the substrate film comprises an adhesive, a transparent plastic, a glass, a dichroic coating, a scattering material, a reflective polarizer, an absorbing polarizer, a multilayer optical film, a retarder, a reflector, a retro reflector, a microstructured material, a lenticular structured material, a fresnel structured material, an absorber, or a combination thereof.

Item 42 is the method of any of items 30 to item 41, further comprising singulating the optical component array by severing substrate film, the first land region, and the second land region by laser cutting, sawing, milling, fly-cutting, or a combination thereof.

Item 43 is an optical component array, comprising: a planar optical stack; and a plurality of first structures machined into the planar optical stack, each of the plurality of first structures having a first surface proximate to a major surface of the planar optical stack and a first land region connecting adjacent first structures.

Item 44 is the optical component array of item 43, further comprising a plurality of second machined structures each having a second surface proximate to an opposing major surface of the planar optical stack, and a second land region connecting adjacent second machined structures, wherein each of the plurality of the first and the second machined structures are aligned in registration to form an array of substantially identical optical components.

Item 45 is the optical component array of item 43 or item 44, wherein the planar optical stack comprises an adhesive, a transparent plastic, a glass, a dichroic coating, a scattering material, a reflective polarizer, an absorbing polarizer, a multilayer optical film, a retarder, a reflector, a retro reflector, a microstructured material, a lenticular structured material, a fresnel structured material, an absorber, or a combination thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of making a polarizing beamsplitter (PBS) array, comprising:
    machining a first ridge into a first sheet opposite a first planar surface, such that the first ridge is adjacent a substantially flat first land region parallel to the first planar surface;
    machining a second ridge into a second sheet opposite a second planar surface, such that the second ridge is adjacent a substantially flat second land region parallel to the second planar surface;
    positioning a substrate film between the first planar surface and the second planar surface;
    aligning in registration the first ridge with the second ridge, such that the substantially flat first land region and the substantially flat second land region are immediately opposite the substrate film from each other; and
    adhering the substrate film between the first planar surface and the second planar surface.

2. The method of claim 1, further comprising machining a crosscut into at least one of the first and second sheets at an angle to the first ridge and the second ridge.

3. The method of claim 2, wherein the crosscut is perpendicular to the first ridge and the second ridge.

4. The method of claim 1, wherein the substrate film comprises an adhesive, a transparent plastic, a glass, a dichroic coating, a scattering material, a reflective polarizer, an absorbing polarizer, a multilayer optical film, a retarder, a reflector, a retro reflector, a microstructured material, a lenticular structured material, a fresnel structured material, an absorber, or a combination thereof.

* * * * *